United States Patent [19]

Wesling et al.

[11] Patent Number: 5,280,736
[45] Date of Patent: Jan. 25, 1994

[54] ENGINE SHAFT BALANCE ASSEMBLY

[75] Inventors: Richard A. Wesling, Cincinnati; Terry T. Eckert, Fairfield; Phillip W. Rambo, Cincinnati, all of Ohio

[73] Assignee: General Electric Company, Cincinnati, Ohio

[21] Appl. No.: 3,893

[22] Filed: Jan. 11, 1993

Related U.S. Application Data

[62] Division of Ser. No. 628,527, Dec. 17, 1990, Pat. No. 5,205,189.

[51] Int. Cl.$^5$ .............................................. F16F 15/32
[52] U.S. Cl. .................................. 74/573 R; 464/180
[58] Field of Search ............... 74/572, 573 R; 464/180

[56] References Cited

U.S. PATENT DOCUMENTS

| | | | |
|---|---|---|---|
| 404,608 | 6/1889 | Dronsfield | 74/573 R |
| 1,130,210 | 3/1915 | Spence | 74/573 R |
| 1,138,592 | 5/1915 | Little | 74/573 R |
| 1,352,005 | 9/1920 | Larsson | 74/573 R |
| 2,702,995 | 3/1955 | Biedess | |
| 2,861,471 | 11/1958 | Kronenberg | 74/573 R |
| 2,895,766 | 7/1959 | Leopold, Jr. | 74/573 |
| 3,407,545 | 10/1968 | Imiolczyk | 41/169 |
| 3,702,082 | 11/1972 | Decker | 74/573 |
| 3,838,464 | 8/1974 | Doyle | 74/573 |
| 3,940,948 | 3/1976 | Schultenkamper | |
| 3,964,342 | 6/1976 | Beam, Jr. et al. | 74/573 R |
| 4,023,438 | 5/1977 | Birkle et al. | 464/180 |
| 4,043,147 | 8/1977 | Wiebe | |
| 4,059,972 | 11/1977 | Beam, Jr. et al. | |
| 4,455,887 | 6/1984 | Lissajoux et al. | 74/573 R |
| 4,512,681 | 4/1985 | Hayhurst et al. | 74/573 R |
| 4,539,864 | 9/1985 | Wiebe | 74/573 R |
| 4,624,597 | 11/1986 | Johnson et al. | 74/567 |
| 4,667,532 | 5/1987 | Holz et al. | 174/573 R |
| 4,842,485 | 6/1989 | Barber | 74/573 R |
| 5,205,189 | 4/1993 | Wesling et al. | 74/573 R |

FOREIGN PATENT DOCUMENTS

| | | | |
|---|---|---|---|
| 621061 | 5/1961 | Canada | 74/573 R |
| 2319489 | 11/1974 | Fed. Rep. of Germany | 74/573 R |
| 4-19443 | 1/1992 | Japan | 74/573 R |
| 482685 | 4/1938 | United Kingdom | 74/573 R |
| 805371 | 12/1958 | United Kingdom | 74/573 R |

OTHER PUBLICATIONS

Drawing, p. 57 of CF6-80C2 Basic Engine & Systems PMC Manual, GEK 92459, GE Aircraft Engines.

Primary Examiner—Rodney H. Bonck
Assistant Examiner—Ryan W. Massey
Attorney, Agent, or Firm—Jerome C. Squillaro; John R. Rafter

[57] ABSTRACT

A balancing assembly for a gas turbine hollow drive shaft is disclosed. The balance assembly includes an expandable balance weight carrier and a device for expanding the carrier inside the hollow drive shaft. In a preferred embodiment the carrier comprises a split ring with a plurality of apertures at which balance weights can be received. Combinations of balance weights can be located around the carrier ring to establish an imbalance correction on the carrier. The carrier can then be positioned inside the shaft and expanded against the shaft with the imbalance correction directed opposite the shaft imbalance.

8 Claims, 4 Drawing Sheets

ENGINE SHAFT BALANCE ASSEMBLY

This application is a division, of application Ser. No. 07/628,527, filed Dec. 17, 1990 and now U.S. Pat. No. 5,205,189.

BACKGROUND OF THE INVENTION

1. Field of the Invention

The present invention relates generally to balancing gas turbine drive shafts, and more particularly to a balancing assembly which can be expanded inside a hollow drive shaft. The balance assembly can include an expandable balance weight carrier ring split for expansion against the inside surface of a hollow drive shaft, and is adapted to carry a plurality of balance weights.

2. Description of the Known Art

The main drive shafts of gas turbine engines are subject to mass imbalance due to manufacturing variations. The shafts must be balanced prior to assembly in the engine in order to reduce shaft vibration during engine operation.

Shaft imbalance is characterized by a magnitude of imbalance and an angular direction of imbalance. The magnitude of imbalance caused by an eccentric rotating mass (such as that formed by machining variations) is a function of the weight of the mass and the radial distance of the mass from the axis of rotation. The angular direction of imbalance is determined by the angular position of the eccentric mass relative to an arbitrary reference direction. The principle used in correcting the imbalance of a shaft is generally known and includes determining the magnitude and direction of shaft imbalance and generating an oppositely directed imbalance of the same magnitude. Means for determining the direction and magnitude of imbalance are well known by those skilled in the art.

Typically, shaft imbalance corrections are made at more than one axial location, or plane, along a shaft. Shafts are commonly balanced at three locations along the shaft, and it is desirable to be able to locate the balance correction assemblies at locations along the shaft where they will be most effective.

Accordingly, an ideal balance assembly would have a simple construction, provide a precisely variable correction to both imbalance magnitude and imbalance direction, and require minimum modification of a hollow shaft to allow positioning of the balance assembly along the hollow shaft where the balance assembly will be most effective.

One known method of balancing shafts that can provide variable imbalance correction requires grinding or machining material from raised lands on the outside surface of the shaft. However, since the maximum diameter of the shaft is limited by the opening in the engine core, the load carrying portion of the shaft must be reduced to allow for the raised lands. This results in an inefficient use of shaft diameter, increased shaft weight, and reduced stiffness of the load carrying portion of the shaft. In addition, machining the shaft may introduce areas of stress concentration that can reduce the shaft's load carrying capability.

A known method of balancing shafts that eliminates machining of shaft material is disclosed in U.S. Pat. No. 3,964,342 and divisional application 4,059,972, both issued to Beam et al. The patents disclose a balance tube assembly mounted within a hollow shaft. The balance tube includes exterior splined lands, each land holding a pair of balance weights with mating internal splines. Each balance weight mounted on the balance tube has a surface for locating the balance tube assembly inside a hollow shaft. Shaft imbalance is corrected by indexing paired balance weights relative to one another on each splined land prior to inserting the balance tube assembly inside a hollow shaft. The design requires a balance tube, which adds weight and complexity to the design. The location of the balance weights within the hollow shaft is limited by the location of the splined lands on the balance tube. The precision of the imbalance correction in the design is limited, since the imbalance correction is made by indexing the splined balance weights on the splined balance tube. An increased number of splines provides finer balance adjustment, but is also more expensive in terms of machining the balance tube and each balance weight.

Other internal shaft balance assemblies are known, such as those shown in U.S. Pat. No. 4,667,532 issued to Holz et al., and U.S. Pat. No. 4,455,887 issued to Lissajoux et al. However, these assemblies tend to be complex, and require internal machining of the shaft to accomodate the balance assembly. Other internal shaft balance assemblies shown in U.S. Pat. Nos. 4,043,147 and 4,539,864 issued to Wiebe require that a stiffening plate or plug be located in the shaft to accomodate the balance assembly. U.S. Pat. No. 4,539,864 also discusses the drawback of attaching a balance weight to one of the bolts which normally hold the stiffener plates in the shaft together, in that the precision of the balance direction angular adjustment is limited by the number of bolts in the stiffener plate.

As a result, gas turbine engineers continue to search for simple yet effective means for balancing gas turbine engine drive shafts.

SUMMARY OF THE INVENTION

It is therefore an object of the present invention to provide a hollow drive shaft balance assembly with a precisely variable correction to both imbalance magnitude and imbalance direction.

It is a further object of the present invention to provide a balance assembly that eliminates stress concentrations and weight penalties associated with machining the exterior of the shaft.

It is a further object of the present invention to provide a balance assembly that requires no additional internal machining of the shaft.

It is a further object of the present invention to provide a balance assembly that can be positioned at any point along the interior of a hollow shaft having a given internal diameter.

The objects of the invention will be more fully understood from the drawings and the following description. Briefly, a balance assembly for correcting shaft imbalance is disclosed which includes an expandable balance weight carrier and means for expanding the balance weight carrier against the inside surface of a hollow shaft. The balance weight carrier is preferably a split ring with a plurality of symmetrically arranged apertures for receiving one or more balance weights. The magnitude of the imbalance correction can be varied by using balance weights with varying weight values, as well as by positioning combinations of balance weights around the carrier to obtain a desired magnitude of imbalance correction. The direction of the imbalance correction is obtained by inserting the balance weight carrier inside the hollow shaft in the desired angular orientation, and expanding the balance weight carrier against the inside surface of the shaft to fix the carrier and imbalance correction direction with respect to the known shaft imbalance direction.

BRIEF DESCRIPTION OF THE DRAWINGS

While the specification includes a series of claims which particularly point out and distinctly claim the subject matter which the applicants consider to be their invention, a more complete understanding of the invention will be gained from the following detailed description which is given in connection with the accompanying drawings, in which:

DETAILED DESCRIPTION OF THE DRAWINGS

Figure 1:
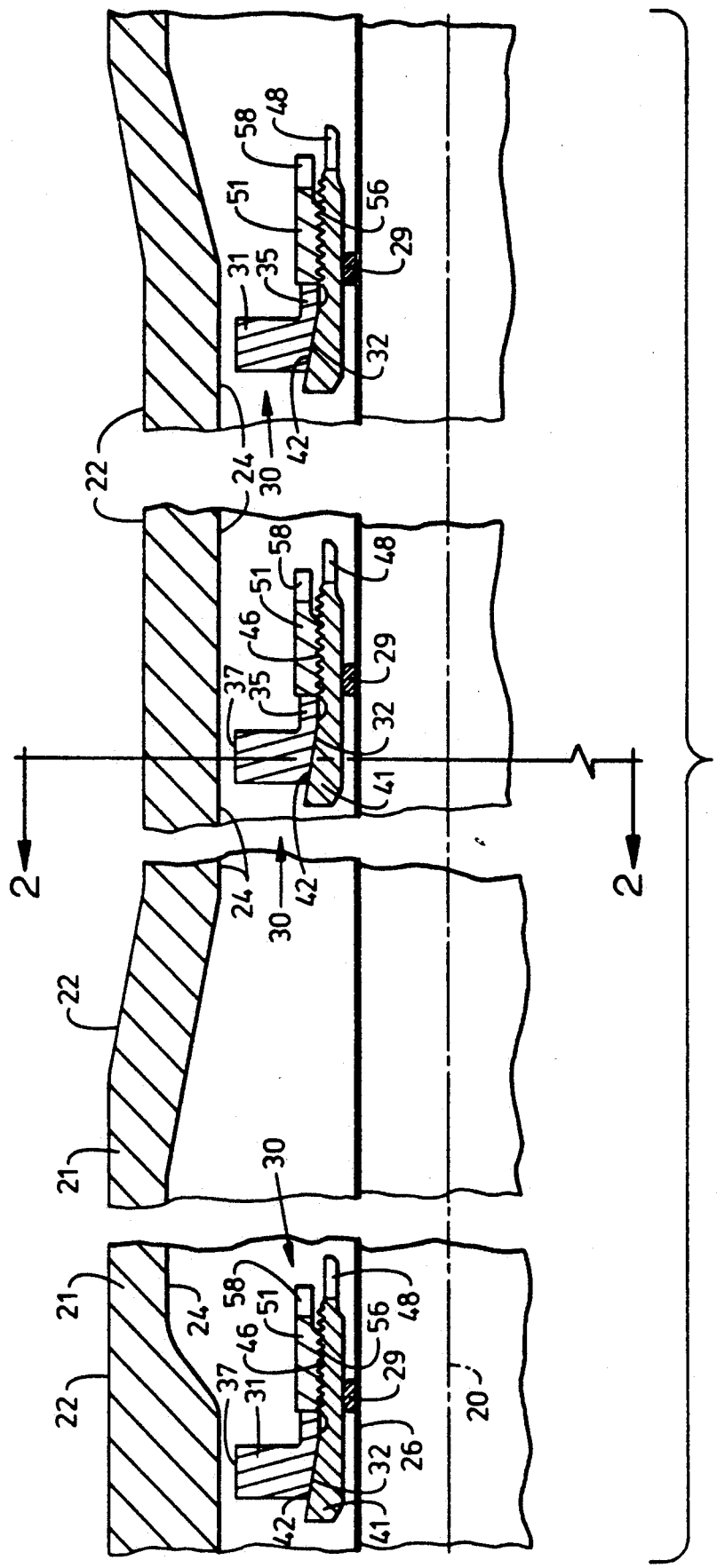
FIG. 1 is an illustration of a partial cross-sectional view of a hollow drive shaft disposed about an engine axis showing a known assembly for supporting a non-structural vent tube inside the shaft, where the half of the cross-section below axis 20 has been omitted for clarity.

Referring now to the drawings wherein like reference numbers are used for like elements throughout, FIG. 1 shows a portion of a gas turbine hollow drive shaft 21 disposed for rotation about a longitudinal shaft axis 20. Such drive shafts are typically used in a gas turbine engine to transmit torque generated by bladed rotors which are not shown. The shaft includes an outer surface 22 and an inner surface 24. Ideally, the shaft mass would be uniformly distributed about axis 20 at any location, or plane, along axis 20. The shaft as machined, however, typically includes mass imbalance due to manufacturing variations. The mass imbalance may vary along the length of the shaft. The mass imbalance must be corrected prior to assembly of the shaft within the gas turbine engine in order to reduce shaft vibrations and ensure proper engine operation. Typically, the mass imbalance is corrected by machining away material on lands on the outside surface 22 of shaft 21.

FIG. 1 also shows a known practice of supporting a vent tube 26 inside and coaxial with shaft 21. Vent tube 26 is a non-structural air passageway supported inside shaft 21 at spacers 29 which can be integral with vent tube 26. Vent tube 26 is supported inside shaft 21 by three support assemblies 30. Each support assembly 30 includes a split ring 31, a generally axisymmetric tapered threaded sleeve 41, and a generally axisymmetric self locking nut 51.

Split ring 31 includes a first inclined surface 32 that mates with a generally oppositely facing second inclined surface 42 on sleeve 41. Sleeve 41 includes external threads 46 for engagement with internal threads 56 on nut 51. Sleeve 41 is coaxially insertable within split ring 31 so that surfaces 32 and 42 are in sliding engagement.

Figure 2:
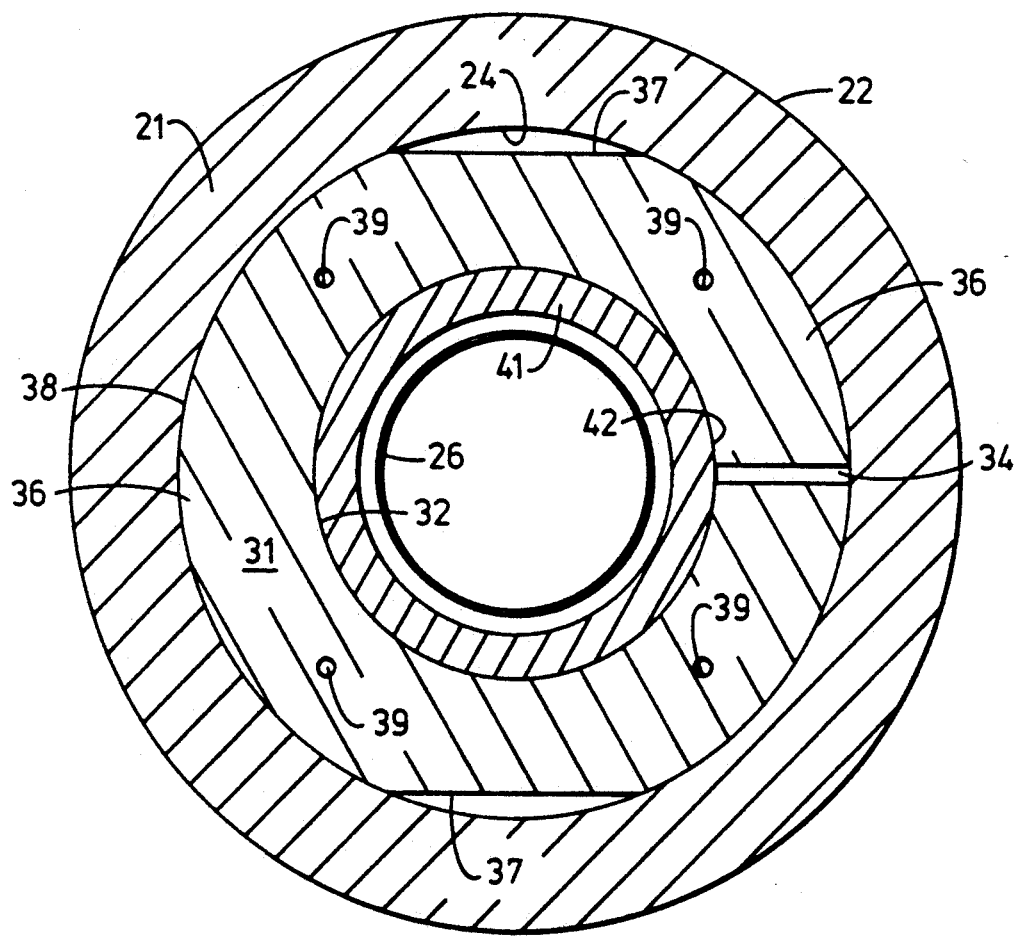
FIG. 2 is an illustration of a view along section 2—2 in FIG. 1.

FIG. 2 shows split ring 31, sleeve 41, and shaft 21 viewed along arrows 2—2 in FIG. 1. The split ring 31 includes a radially and axially extending slot 34 and two lobe sections 36 with outwardly facing contact surfaces 38 for engagement with the inside surface 24 of the drive shaft 21. Surfaces 38 are separated by flat surfaces 37. Four pin holes 39 extend through the ring 31 to aid in assembly. Wires or string are extended through the holes 39 to support and orient the ring inside the drive shaft during assembly. Other known split rings 31 may include four lobes 36, each having an outwardly facing contact surface 38.

Each assembly 30 is mounted on vent tube 26 and located along vent tube 26 at a spacer 29. Sleeve 41 includes circumferentially spaced tabs 48 (FIG. 1) by which sleeve 41 can be held stationary with a tool (not shown) while nut 51 is turned. Nut 51 can then be advanced on sleeve 41 into engagement with an axially extending hub flange 35 on split ring 31. Further advancement of nut 51 on sleeve 41 results in radial expansion of split ring 31 by forcing first surface 32 on split ring 31 to slide outwardly on second surface 42 on sleeve 41.

Nut 51 can be advanced on sleeve 41 to expand split ring 31 against inside drive shaft surface 24 so that outwardly facing surfaces 38 on split ring 31 tightly engage inside surface 24 of drive shaft 21. The resulting engagement of surfaces 38 with surface 24 positions vent tube 26 radially within drive shaft 21.

Figure 3:
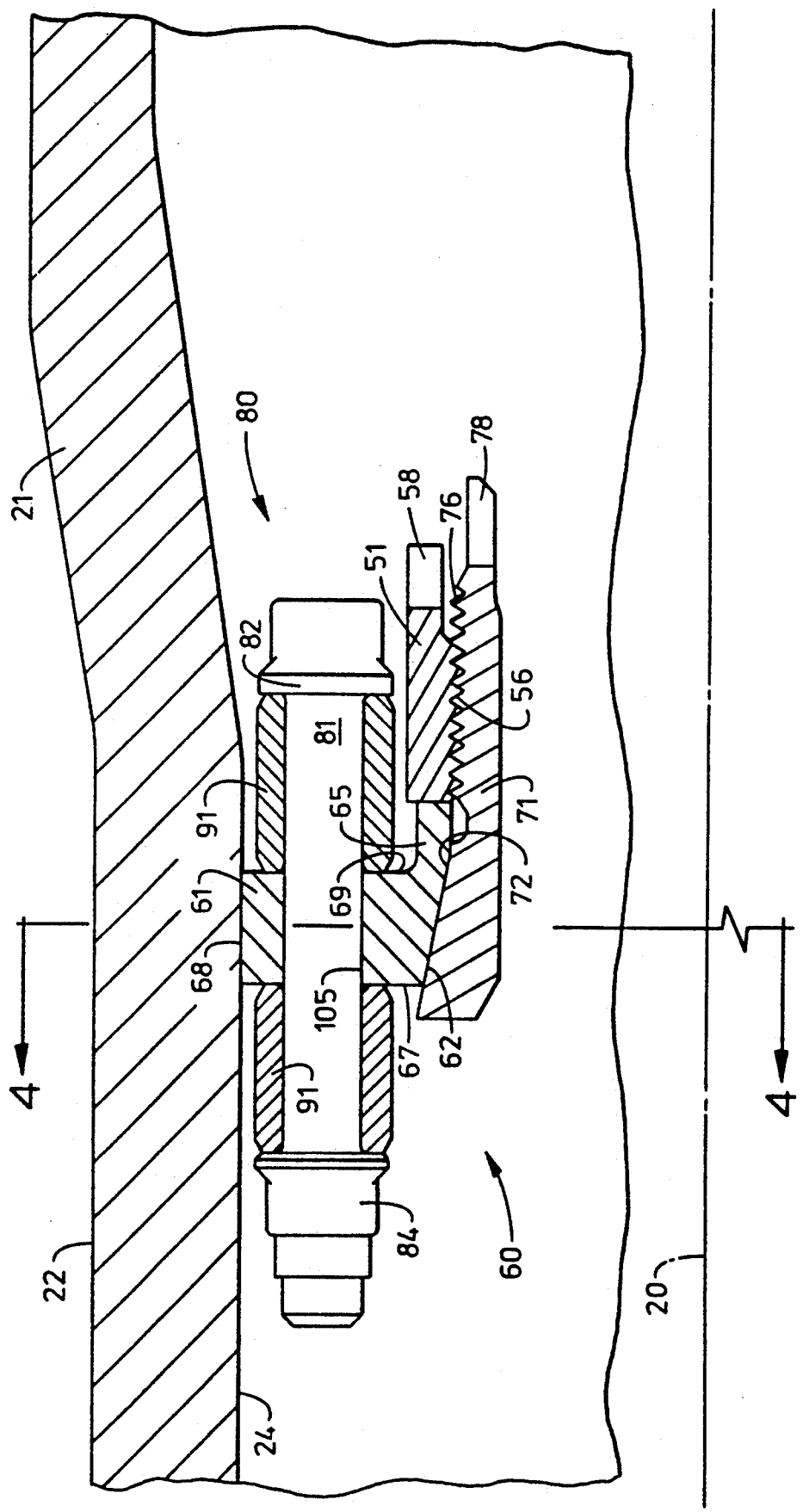
FIG. 3 is an illustration of a partial cross-sectional view of the claimed balancing assembly inside a hollow drive shaft, where the half of the cross section below axis 20 has been omitted for clarity.
Figure 4:
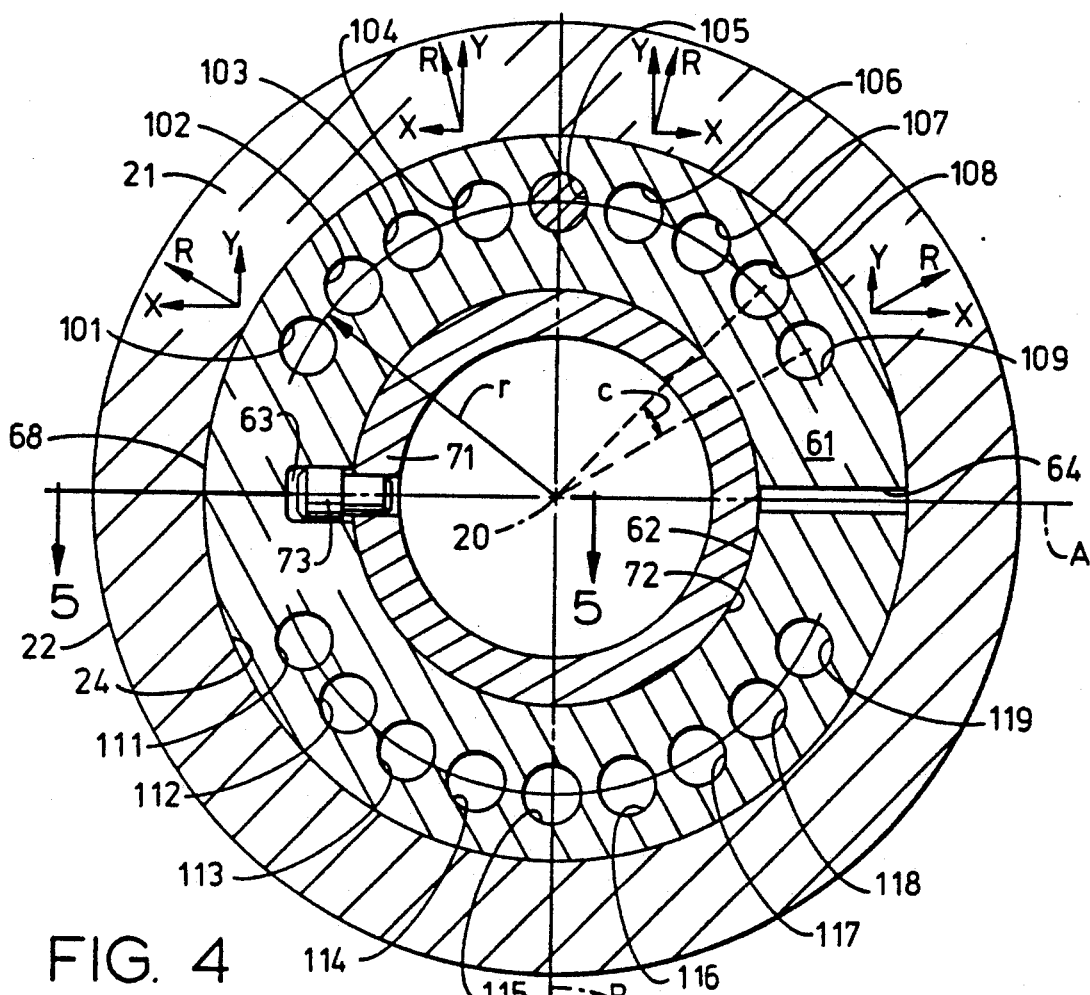
FIG. 4 is an illustration of a view taken along section 4—4 in FIG. 3.
Figure 5:
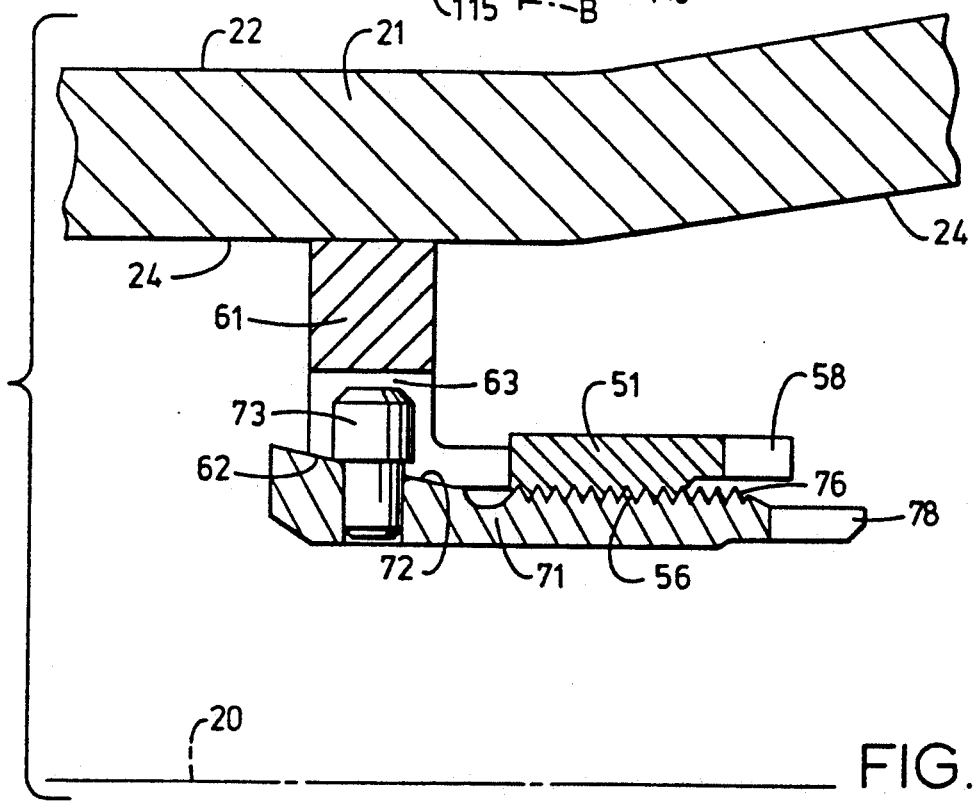
FIG. 5 is an illustration of a view taken along section 5—5 in FIG. 4.

FIGS. 3, 4, and 5 are illustrations of a balancing assembly 60 in accordance with the present invention. Referring to FIG. 3, the balancing assembly includes an expandable carrier ring 61 insertable in shaft 21 and adapted to receive a plurality of balance weights 91, connecting means 80 for attaching the weights 91 to ring 61, and means for expanding the carrier ring 61 against the inside surface 24 of shaft 21. The means for expanding ring 61 can include a generally axisymmetric sleeve 71 and a generally axisymmetric nut 51.

In a preferred embodiment the ring 61 includes a first face 67, a generally oppositely facing second face 69, and is split at a slot 64 (FIG. 4) extending axially from face 67 to face 69. A radially outwardly facing contact surface 68 extends axially from first face 67 to second face 69. Surface 68 extends substantially continuously around the circumference of ring 61, being interrupted at only one location by slot 64, as shown in FIG. 4. Ring 61 includes an inner hub comprising a flange 65 extending axially from second face 69, and a first inclined surface 62.

Sleeve 71 is insertable within ring 61 and includes a second inclined surface 72 for mating with generally oppositely facing surface 62, and external threads 76 spaced axially from surface 72. Nut 51 includes internal threads 56 for engagement with threads 76. A plurality of axially extending and circumferentially spaced tabs 78 on sleeve 71 can be engaged by a tool (not shown) to hold sleeve 71 stationary and in a desired position within shaft 21 while nut 51 is advanced on sleeve 71.

As shown in FIGS. 4 and 5, the balancing assembly 60 can also include positioning means for preventing rotation of carrier ring 61 relative to sleeve 71 during expansion of the carrier ring. Ring 61 can include a radially inwardly facing positioning slot 63 which extends axially from face 67 to face 69. Positioning slot 63 is preferably spaced 180 degrees from slot 64 to lie on an imaginary ring diameter A extending radially through and substantially aligned with slot 64. Imaginary ring diameter A separating the carrier ring into two symmetric halves, a first half above diameter A and a second half below diameter A. A position pin 73 is press fit in a hole in sleeve 71, and extends radially outwardly from sleeve 71 for slidable engagement with positioning slot 63, thereby circumferentially fixing ring 61 with respect to sleeve 71. Pin 73 prevents ring 61 from rotating relative to sleeve 71 during advancement of nut 51 on sleeve 71. Since sleeve 71 is held stationary with respect to shaft 21 during advancement of nut 51, as described above, pin 73 also ensures that ring 61 does not rotate relative to shaft 21 during advancement of nut 51.

Positioning slot 63 can be sized to eliminate weight imbalance in the ring and sleeve due to slot 64 and position pin 73. Alternatively, a positioning pin could extend radially inward from ring 61 for slidable engagement with a radially outward facing positioning slot on sleeve 71.

Carrier ring 61 can also include a plurality of apertures extending axially from face 67 to face 69, indicated by reference numbers 101 through 119 in FIG. 4. As shown in FIG. 3, ring shaped balance weights 91 can be eccentrically secured to carrier ring 61 at each aperture by connecting means 80, where each connecting means 80 preferably comprises a bolt 81 and fastening nut 84. One or two balance weights can be secured to the ring 61 at each aperture by capturing a weight between a bolt head 82 and carrier ring face 69, or between nut 84 and the other ring face 67. The imbalance correction magnitude at a particular aperture will of course also include the weight of the bolt 81 and nut 84.

The apertures are preferably located on a common radius r, as shown in FIG. 4, so that a given balance weight will produce the same imbalance correction magnitude at each aperture. The apertures are also preferably arranged symmetrically about a first radial axis, such as diameter A in FIG. 4, and a second radial axis, such as diameter B in FIG. 4, said two radial axes being perpendicular to each other in the plane of the carrier ring, to prevent the apertures themselves from causing an imbalance. When the balance assembly is installed in shaft 21, diameter A and diameter B are preferably both substantially perpendicular to shaft axis 20, and the intersection of diameter A and diameter B preferably coincides with axis 20.

An equal number of apertures can be located on each side of diameter A. The apertures on each side of diameter A are preferably spaced apart equally by an angle C. Angle C is between 15 and 20 degrees, and preferably about 15 degrees to establish an array of at least eighteen apertures 101 through 119 capable of receiving one or more weights eccentric with respect to shaft axis 20 to counterbalance a wide range of shaft imbalance.

An equal number of apertures can be located on each side of diameter B, the apertures on one side of diameter B being symmetric with those on the opposite side of diameter B. A single aperture on one side is considered paired with its symmetric counterpart, creating a plurality of paired positions for the installation of the balance weights.

The balance weights are preferably arranged symmetrically about diameter B, and asymmetrically about diameter A, so that the imbalance correction direction is directed parallel to diameter B. Balance weights are preferably added or removed in pairs, except at apertures 105 and 115, in as much as balance weights received at apertures 105 and 115 produce an imbalance parallel to diameter B. For instance, equal balance weight can be added at apertures 102 and 108 to maintain symmetry about diameter B.

It has been found that balance weights available in three sizes are sufficient to provide a precisely variable magnitude of shaft imbalance correction. For instance, balance weights of approximately 1, 3.8, and 6.5 grams can be used. The magnitude of the total imbalance correction can be varied by varying the magnitude of the resultant imbalance correction, R (FIG. 4), at a particular aperture, as well as by varying the position of the weights around the ring 61.

The resultant imbalance correction, R, at a particular aperture can be varied by using one of three weight sizes, or by securing one or two weights at the aperture.

The magnitude of the total imbalance correction can also be varied by varying the position of balance weights around the carrier ring. The resultant imbalance correction R at any aperture is directed radially outwardly from axis 20, and generally includes a component parallel to diameter B (labeled y in FIG. 4) and a component parallel to diameter A (labeled x in FIG. 4). Weights secured in apertures close to diameter B (at apertures 104 and 106 for instance) contribute a large component of imbalance correction parallel to diameter B, while those located further from diameter B (such as at aperture 101 and 109) provide a smaller component of imbalance correction along diameter B. In addition, the resultant imbalance correction provided by weights located on one side of diameter A can be partially offset by weights located on the other side of diameter A.

The components parallel to diameter A will generally not affect balance where balance weights are placed symmetrically in pairs about diameter B, since the components x on one side of diameter B will be equal but oppositely directed to the components x on the other side of diameter B, thereby resulting in a zero net imbalance correction along diameter A.

The balance weights 91 and the position of the balance weights around the carrier ring 61 are selected to establish a counter balance magnitude equal to the shaft imbalance magnitude at a particular location along the shaft axis.

The balance assembly 60 with balance weights 91 attached eccentrically to the carrier ring 61 can be installed inside shaft 21 and rotated so that the imbalance correction along diameter B is directed precisely to cancel the known shaft imbalance. Nut 51 can be advanced on sleeve 71 into engagement with an axially extending hub flange 65 on carrier ring 61. Further advancement of nut 51 on sleeve 71 results in radial expansion of carrier ring 61 by forcing first inclined surface 62 on carrier ring 61 to slide outwardly on second inclined surface 72 on sleeve 71. Nut 51 can be advanced on sleeve 71 to expand carrier ring 61 against inside drive shaft surface 24 so that outwardly facing surface 68 on carrier ring 61 tightly engages inside surface 24 of drive shaft 21, thereby fixing the angular position of the imbalance correction precisely relative to drive shaft 21, without the need for splines, threading, or other indexing means on the inside surface of the drive shaft.

In a preferred embodiment balance assemblies 60 are used to correct imbalance at at least three locations along the axis 20. The balance assemblies 60 may also serve to support a non-structural vent tube. However, there is no requirement that the balance assembly support a vent tube, and the balance assembly may be located anywhere along the shaft 21 where balance correction is required, provided the carrier ring can be expanded against the shaft inside diameter at that location.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope of the invention. For instance, the invention has been shown with weights attached by a bolt assembly, but in another embodiment the weights could be designed to thread directly into threaded apertures or into threaded inserts in the apertures, or be otherwise fastened to ring 61.

Therefore, it is intended that the invention not be limited to the particular embodiment disclosed as the best mode contemplated for carrying out this invention, but that the invention will include all embodiments falling within the scope of the appended claims.

We claim:

1. A method of balancing a gas turbine engine hollow drive shaft rotatable about a longitudinal shaft axis and having an inside surface, the drive shaft exhibiting an imbalance with respect to the axis, wherein the method comprises the steps of:
   1) determining a magnitude and a direction of the shaft imbalance;
   2) supporting at least one balance weight eccentrically on an expandable balance weight carrier to establish a counter balance magnitude approximately equal to the shaft imbalance magnitude;
   3) inserting the balance weight carrier within the drive shaft;
   4) positioning the balance weight carrier inside the drive shaft such that the counter balance direction is directed oppositely to the shaft imbalance direction; and
   5) expanding the balance weight carrier against the drive shaft inside surface to fix the counter balance direction relative to the drive shaft; and
   6) wherein the step of expanding comprises the steps of:
      A) inserting a generally axisymmetric sleeve within the balance weight carrier; and
      B) forcing a first inclined surface on the balance weight carrier to slide outwardly on a second inclined surface on the sleeve.

2. The method recited in claim 1, wherein the step of expanding the carrier further comprises expanding a split carrier ring.

3. The method recited in claim 1, further including the step of restraining rotation of the carrier relative to the drive shaft during expansion of the carrier, said step of restraining comprising the steps of:
   1) fitting a position pin in a hole in the sleeve; and
   2) engaging the position pin with a positioning slot in the balance weight carrier.

4. A method of balancing a gas turbine engine hollow drive shaft rotatable about a longitudinal shaft axis and having an inside surface, the drive shaft exhibiting an imbalance with respect to the axis, wherein the method comprises the steps of:
   1) determining a magnitude and a direction of the shaft imbalance;
   2) supporting at least one balance weight eccentrically on an expandable balance weight carrier to establish a counter balance magnitude approximately equal to the shaft imbalance magnitude;
   3) inserting the balance weight carrier within the drive shaft;
   4) positioning the balance weight carrier inside the drive shaft such that the counter balance direction is directed oppositely to the shaft imbalance direction; and
   5) expanding the balance weight carrier against the drive shaft inside surface to fix the counter balance direction relative to the drive shaft; and
   6) wherein the step of supporting the balance weight on the carrier comprises adapting the carrier to receive at least one balance weight at a plurality of apertures in the carrier.

5. The method recited in claim 4, wherein the step of supporting the balance weight on the carrier includes passing a bolt through at least one balance weight for fixedly attaching at least one balance weight at at least one aperture on the carrier.

6. The method recited in claim 4, wherein the step of adapting the carrier includes positioning apertures symmetrically with respect to at least two mutually perpendicular axes.

7. The method recited in claim 4, wherein the step of adapting the carrier includes positioning the apertures on a common radius.

8. The method recited in claim 4, wherein the step of expanding the carrier comprises expanding a split carrier ring, and wherein the step of adapting the carrier includes positioning the apertures symmetrically with respect to both a first diameter substantially aligned with the split in the carrier ring and a second diameter perpendicular to the first diameter.

* * * * *